(12) United States Patent
Bonfils

(10) Patent No.: US 7,594,822 B2
(45) Date of Patent: Sep. 29, 2009

(54) CONNECTING BAR WITH FLAT INTERFACE

(75) Inventor: Jean-Michel Bonfils, Seyssinet Pariset (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 0 days.

(21) Appl. No.: 12/289,829

(22) Filed: Nov. 5, 2008

(65) Prior Publication Data

US 2009/0130904 A1 May 21, 2009

(30) Foreign Application Priority Data

Nov. 20, 2007 (FR) .................................. 07 08126

(51) Int. Cl.
*H01R 13/52* (2006.01)
(52) U.S. Cl. .................... 439/277; 439/755; 439/588; 439/883
(58) Field of Classification Search ................. 439/277, 439/519, 522, 883, 588, 755
See application file for complete search history.

(56) References Cited

U.S. PATENT DOCUMENTS

| | | | | |
|---|---|---|---|---|
| 3,617,986 | A * | 11/1971 | Becker et al. | 439/277 |
| 4,643,508 | A * | 2/1987 | Schaller | 439/31 |
| 4,936,799 | A * | 6/1990 | Woodall | 439/755 |
| 5,024,619 | A * | 6/1991 | Caraballo | 439/755 |
| 5,828,017 | A * | 10/1998 | Fiorini et al. | 200/17 R |
| 6,042,431 | A * | 3/2000 | Hayakawa | 439/801 |
| 6,152,784 | A * | 11/2000 | Pyles | 439/764 |
| 6,153,329 | A * | 11/2000 | Raschilla et al. | 429/65 |
| 7,344,421 | B1 * | 3/2008 | Spencer | 439/755 |
| 2002/0008084 | A1 | 1/2002 | Arioka et al. | 218/12 |
| 2003/0049964 | A1 * | 3/2003 | Pogliani | 439/588 |
| 2004/0121657 | A1 | 6/2004 | Muench et al. | 439/723 |
| 2006/0051981 | A1 | 3/2006 | Neidlein et al. | 439/39 |
| 2007/0227757 | A1 | 10/2007 | Moore | 174/92 |
| 2009/0130904 | A1 * | 5/2009 | Bonfils | 439/607.58 |

FOREIGN PATENT DOCUMENTS

| | | |
|---|---|---|
| AU | 728925 | 1/1999 |
| EP | 0 563 535 | 10/1993 |
| EP | 0 674 375 | 9/1995 |
| WO | WO 02/067385 | 8/2002 |
| WO | WO 2007/065912 | 6/2007 |

\* cited by examiner

*Primary Examiner*—Ross N Gushi
(74) *Attorney, Agent, or Firm*—Steptoe & Johnson LLP

(57) ABSTRACT

To simplify connection between electrical apparatuses, a connecting bar has been developed wherein the connection interfaces are flat. The connection devices comprise a conducting insert in a compressible insulating elastomer molded from casting, which is coated with a shielding. The connecting surfaces of the conducting inserts are located withdrawn with respect to the connection surfaces of the insulating support. When connection is performed, the insulating surfaces come into contact, compression is then performed enabling the interface to be made air-tight, while at the same time bringing the conducting surfaces into contact. The assembly is kept compressed by means of a central screw which is preferably associated with a blanking device of cover type for the connection surface not used for electrical connection.

The connection solution according to the invention, in addition to speed, flexibility and reliability of connection, in particular enables the arrangements between electrical apparatuses to be simplified by a positioning tolerance, and in particular enables alignment of the pole-units to be connected.

20 Claims, 3 Drawing Sheets

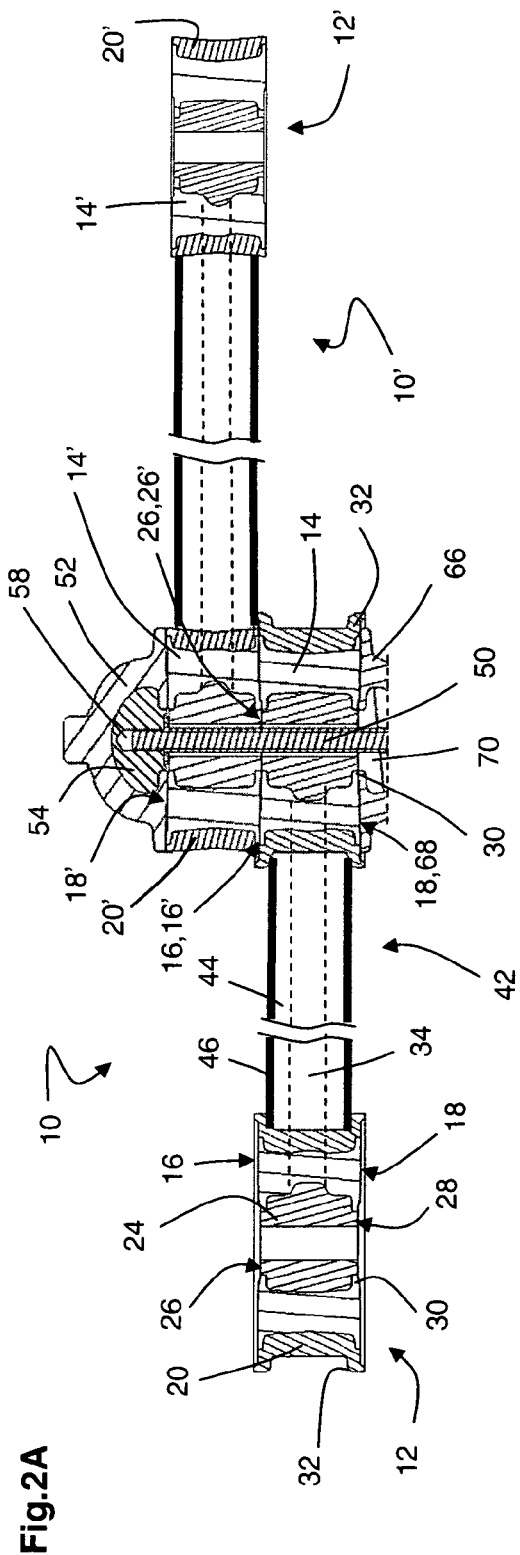
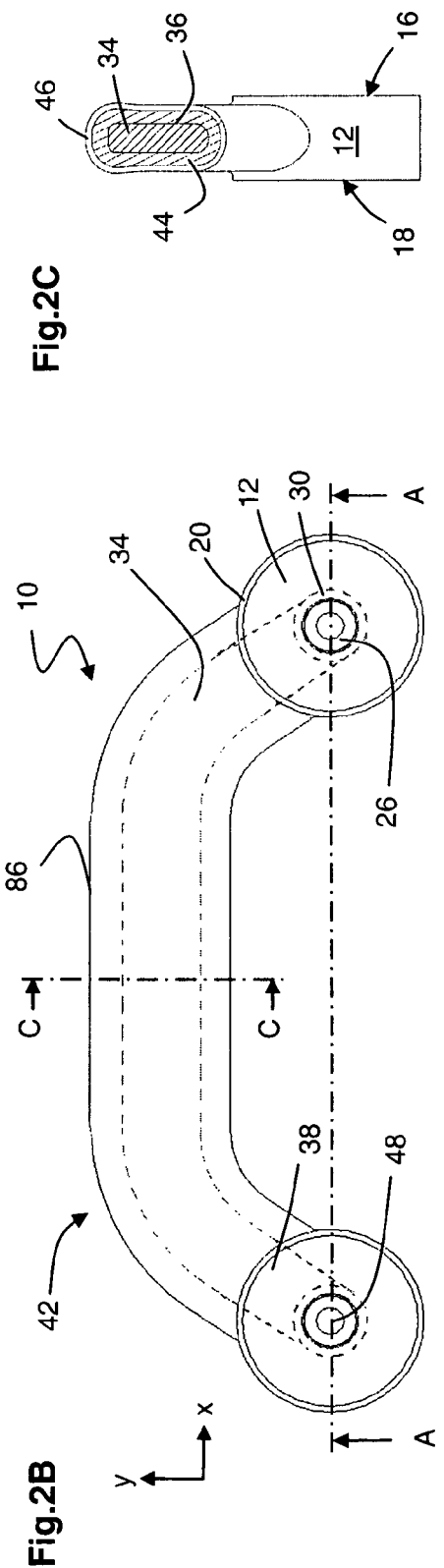

CONNECTING BAR WITH FLAT INTERFACE

BACKGROUND OF THE INVENTION

The invention relates to simplification of electric connection by bars and omnibus bars. More particularly, the invention relates to a shielded connecting bar with connection interfaces that enable electrical connection by contact between flat surfaces. The form and material of the interfaces are chosen such as to guarantee the dielectric strength, in particular for high and/or medium voltage applications. The interfaces are partially deformable, and the bar insulator is molded from casting on the conductor core before preferably being covered by a shielding.

STATE OF THE ART

In electrical equipment, in particular in medium voltage MV (sometimes also called high voltage HV) transformer substations, i.e. with a voltage of about 5 to 52 kV, different equipment units have to be electrically connected to one another. Due to the high voltages involved, it is moreover advantageous to insulate the connections and maybe even to shield them.

In particular, as represented schematically in FIG. 1, when the current is multiphase, at least three connections are imperative on electrical apparatuses 1 connected in series or in parallel via their terminals 2. One electrical connection option (not illustrated) concerns the use of flexible cables connected to electrical apparatuses 1 by means of rigid connectors on the terminals 2, an example whereof is given in the document WO 02/067385, with a connector with numerous components. Another connection mode, also mentioned in this document, concerns the use rigid or semi-rigid bars 4 secured between electrical apparatuses 1", 1s at connection terminals 2, for example via inserted interfaces of biconal type 6 (as described in document FR 2 766 019). Another option integrates the connection interface in bars 8, with the presence of flares: the connection interface is then presented in the form of a jointing, for example as described in document EP 0674375.

These types of connecting devices are however cumbersome, especially in the heightwise direction, so as to guarantee a sufficient dielectric strength, in particular for medium voltage applications: as disclosed in document WO 07/065912, the creepage length must be sufficient. In addition, the connections imply numerous components and therefore multiply the number of interfaces to be checked.

Furthermore, coupling connections by cables require numerous connection interfaces, which interfaces are complex and costly to fit, in particular to ensure an adequate reliability for the applications concerned. Due to their rigidity, the bars do not tolerate any misalignment, which is particularly problematic in the case of multiplication of the connection points and in implementation of the latter.

SUMMARY OF THE INVENTION

Among other advantages, the object of the invention is to palliate some shortcomings of existing connecting means, and in particular to simplify the connection processes while at the same time reducing the overall dimensions resulting therefrom, like the heightwise dimension, in particular for high (or medium) voltage applications. Electrical connection is performed directly, without any intermediate parts, between connection devices having active surfaces that may be superposed. In view of the preferred application for high voltages and of the necessity to control the electric field, the contact interface is achieved such as to avoid the presence of spaces liable to generate electric arcs. The surface is moreover sufficiently extensive to ensure dielectric strength.

More particularly, according to a preferred embodiment, the invention relates to a shielded electrical connecting bar comprising a conducting rod coated with an insulator, that electrically connects two connection devices that are advantageously identical. Each of the connection devices comprises a support, made from insulating material able to be deformed, in particular by crushing, that is delineated by two substantially parallel opposite connection surfaces, and a conducting insert integrated in the insulating support. The insert, preferably of symmetrical revolution, extends between two parallel flat connecting surfaces that open out on the two insulating connection surfaces of the support. Its length is smaller than distance between the two connection surfaces when the insulating material is at rest and, when connection is performed, the insulating support is crushed so that the connecting surface of the conducting insert comes flush with the connection surface at each end, thereby being able to establish a contact between flat surfaces. The contact both acts as electrical connection at the level of the conducting insert and ensures dielectric tightness at the level of the insulating support.

A shielding is preferably present on the external surface of the connecting bar, with the exception of the connection and the connecting surfaces of the connection devices. The shielding can be limited to the connection devices.

To ensure a correct dielectric strength of the connecting bar, the interfaces between insulating and conducting components, and also between components of the same kind, are controlled and in particular are air-tight. The insulating support adheres to the conducting insert and to the end part of the rod connected to the conducting insert, the insulating coating adheres to the residual part of the rod and also to the insulating support, so that there is no residual air. The insulating components, for example made of silicone or EPDM-type elastomer, are preferably jointly molded from casting, namely overmolded, on all the conducting components, advantageously also manufactured unitarily. The shielding then preferably consists of a molding from casting of the same elastomer which is charged so as to ensure electric conduction, that has substantially the same deformation characteristics.

To ensure and maintain orthogonal compression of the connection device and thereby electrical contact, securing means can be provided. The connecting insert can in particular be drilled right through from one side to the other, in particular in its center, so as to be able to insert a securing means like a screw or a gudgeon-pin.

The bar can further be associated with a blanking device superposed on a surface of a connection device not used for electrical connection. This blanking device comprises a flat insulating surface able to be superposed on the surface of the support, that is advantageously rigid so as to contribute to crushing and to minimizing possible dielectric leaks. The blanking device is advantageously used for securing, and it can in particular be associated, securedly or not, with a threaded gudgeon-pin and with means for screwing the gudgeon-pin into the hole of the connecting insert.

The opposite surfaces of a connection support are preferably in the form of discs and the connecting insert is centered therein. Symmetry with respect to the mid-plane of the bar is preferred.

According to a preferred embodiment, the joining rod is of oblong cross-section, presenting two large sides parallel to the connecting surfaces of the inserts of the connection devices. Furthermore, in a view perpendicular to these connecting surfaces, the rod and its coating may be sensibly linear or may present a U-shaped profile, with a central part of the rod situated outside the envelope delineated by the two connection devices of its ends, so that it is possible to insert another bar according to the invention by aligning the connection devices and reversing the orientation of the U's. According to a first option, the rod is flat so that the connecting surfaces of the inserts of the two connection devices are parallel and in the same plane. According to a second option, the rod presents a shoulder, or oblique part, so that the connecting surfaces of the inserts of the two connection devices are parallel, offset along an axis perpendicular to the surfaces, preferably with a surface of a connection device in the same plane as a surface of the other connection device, so as to be able to stack the connecting bars. Modifications in the number of electrical apparatuses connected are moreover simplified.

The invention also relates to an omnibus bar, in particular with three bars, whose connecting devices are identical.

BRIEF DESCRIPTION OF THE DRAWINGS

Other advantages and features will become more clearly apparent from the following description of particular embodiments of the invention given for non-restrictive example purposes only and represented in the accompanying drawings.

FIGS. 2A, 2B, 2C show a bar according to a preferred embodiment of the invention, and also connection between two bars at the level of their connecting devices.

DETAILED DESCRIPTION OF A PREFERRED EMBODIMENT

Figure 1:
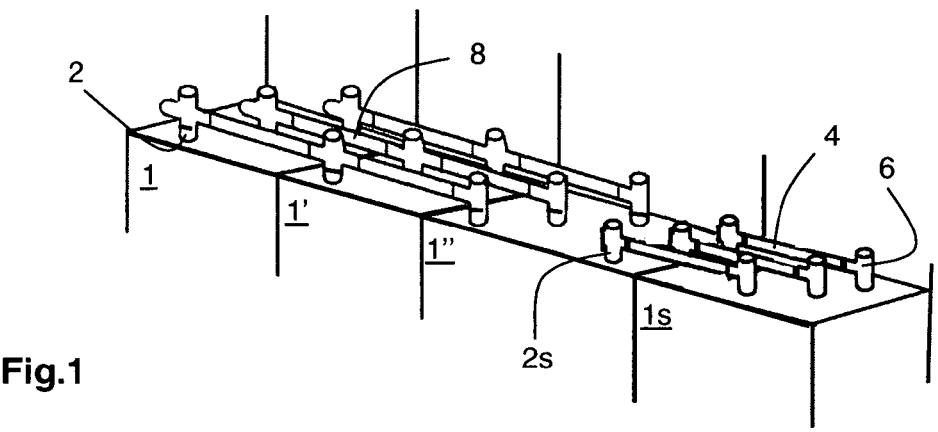
FIG. 1, which has already been described, schematically represents the electrical connections between three-phase medium voltage electrical apparatuses that can be replaced by connecting bars according to the invention.

A connecting bar 10 according to the invention can be used to connect the connection terminals of several electrical apparatuses 1 to one another. It is particularly suited for the electrical apparatuses illustrated in FIG. 1 in which two terminals 2 are connected to place the apparatuses in series or in parallel connection. Although not described, a bar 10 according to the invention could comprise a plurality of connection devices 12, for example three, like illustrated bar 8. However, for the sake of simplicity of connection of bars 10, 10' according to the invention and to take full advantage of the alignment tolerances and of the reduction of the number of industrial references, a bar 10 according to the invention is preferably only provided with connection devices 12 at its two ends. The presence of a third connection device corresponds in this configuration to connection of two bars 10, 10' by simple superposition, as illustrated in FIG. 2A.

According to the invention, a connection device 12 mainly comprises a support 14 made of insulating material. Although it can be of any shape (under the conditions explained further on concerning the size and dielectric strength), insulating support 14 comprises two opposite surfaces 16, 18 designed for connection, that are substantially flat and parallel to one another. It is preferable for connection surfaces 16, 18 to be circular, a shape best suited for managing the different dielectric phenomena and for optimizing the direction of orientation of the stacks. Likewise, it is advantageous for the two opposite surfaces 16, 18 of an insulating support 14 to be superposable so that bar 10 can be used without any preferred orientation. It is in all cases preferable for bar 10 to be symmetric, with all its connection devices 12 identical, their connection surfaces 16, 18 being parallel to one another.

Insulating support 14, with the exception of connection surfaces 16, 18, is advantageously coated with a conducting or semi-conducting layer 20 on its external surface. The thickness is sufficient to ensure electrostatic shielding of the assembly. Maintaining the electric field inside insulating support 14 enables the compactness of the connections achieved by a bar 10 according to the invention equipped with such a device 12 to be increased. It may be desirable to make a return flange on the shielding on the periphery of insulating connection surface 16, 18 to ensure continuity of shielding when contact is made with another similar surface 16'.

Connection device 12 further comprises a connecting insert 24 with a high electric conductivity, usually made of copper or aluminum, that passes through connection device 12 in the thickness of the latter, between two flat and parallel connecting surfaces 26, 28 that are accessible on each side of insulating support 14. Advantageously, connecting insert 24 is centered within insulating support 14 and is of symmetrical revolution so as to master the dielectric stresses as best as possible.

To optimize the dielectric strength, connecting insert 24 is integrated in insulating support 14, and in particular the insulating material is molded from casting, namely overmolded, on insert 24 so that the interface between the two components 14, 24 is controlled and void of vacuum spaces (or gaps filled with air). For the same reasons, it is advantageous for connecting insert 24 to comprise a bulge inside insulating support 14, its central diameter thereby being greater than the diameter of connecting surfaces 26, 28 at the level of which the insulating material forms a collar, or neck, 30 around the insert. Conducting insert 24 may be considered as embedded or "sunk" in insulating material 14.

The size of insulating support 14 and the thickness of collar 30 depend on the size of conducting insert 24, itself determined by the current level flowing therein, and on the electromechanical stresses. Depending on the available space, support 14 may have a cylindrical shape, for example a revolution shape, but to reduce the quantity of material and the overall dimensions, a groove can be formed between the two connection surfaces 16, 18. For ease of superposition, coming into contact and/or alignment, a connection device 12 can comprise peripheral guiding means 32, for example a rim formed by shielding 20.

Connection devices 12 of any one bar 10 are joined to one another by a rod 34 of high electrical conductivity connected, and preferably unitary, with connecting insert 24. Rod 34, made of copper or aluminum, is dimensioned according to the current flowing therein, and is advantageously "rigid", i.e. non compressible. However, to ensure a certain flexibility corresponding to a tolerance in the relative positioning of connection devices 12 in the connection direction (orthogonal to connection surfaces 16 and connecting surfaces 26), the cross-section of rod 34 is preferably "flattened", of oblong shape, as illustrated in FIG. 2C. Rod 34 is in particular a preferably round-edged flat lug. The large sides 36 of the flat lug are substantially parallel to connection surfaces 16, 18 so as to be able to tolerate a slight difference in alignment of connecting surfaces 26, 28 in their plane. This shape is particularly advantageous due to the fact that it moreover reduces the electrodynamic forces on copper rod 34.

Conducting connecting rod 34 is also integrated at its ends 38 in insulating support 14 of connection device 12 (FIG. 2B). Over the rest of its length, residual part 42 corresponding to the apparent length of rod 34 is coated with an insulator 44 which ensures a sufficient dielectric strength. To limit the space required around bar 10, an electrostatic shielding 46 of residual part 42 can also be fitted. The set of insulating components 14, 44 of connecting bar 10 are preferably over-molded, or molded from casting, in a single step on the set of conducting elements 24, 34. Shielding 20, 46 is likewise preferably unitary.

To prevent arc striking when electrical connection is performed and to ensure a tight contact between superposed connection devices 12, 12' of the two bars 10, 10' as illustrated in FIG. 2A, the insulating material of supports 14 is deformable, and its thickness can in particular be reduced by orthogonal crushing between the two opposite surfaces 16, 18. For example the material is an elastomer having known and optimized dielectric qualities, in particular as far as compactness is concerned. Support 14 is molded from casting by e.g. an Ethylene-Propylene Diene Monomer rubber (EPDM in short), or by silicone.

The height of conducting insert 24, defined by the distance between its two connecting surfaces 26, 28, is therefore smaller than the thickness of insulating support 14 at rest. Orthogonal compression of insulating support 14 can move connection surfaces 16, 18 of support 14 towards one another so that the distance separating the latter is equal to said height. In use, insulating surfaces 16, 16' are brought into contact, deformation takes place until conducting connecting surfaces 26, 26' of insert 24 are in contact with one another, and the assembly is kept in this position by the securing means as long as electrical connection is required.

Figure 3:
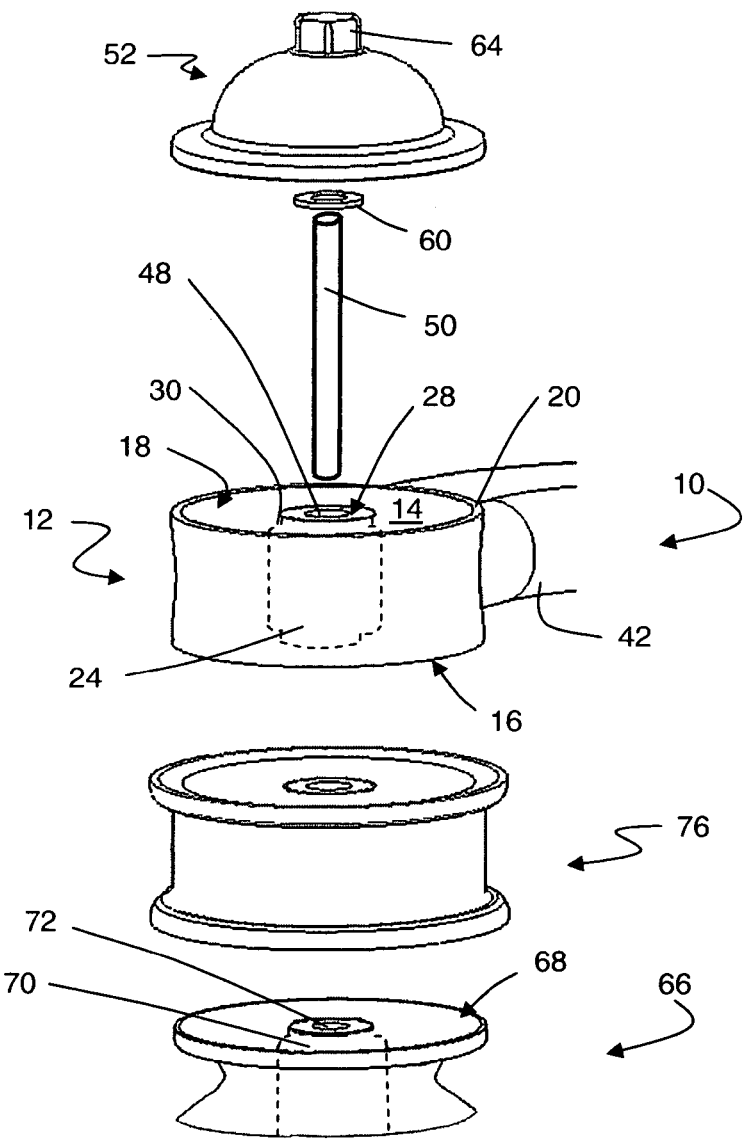
FIG. 3 shows, in an exploded view, the different components able to be used for electrical connection of a terminal with a bar according to the invention.

To maintain deformation of the two insulating supports 14, 14' and therefore contact between connecting surfaces 26, 26' of juxtaposed inserts 24, 24', a securing operation is performed. Several options are possible with for example lateral outgrowths equipped with bolts external to connection device 12. Advantageously, and as presented in FIG. 3, a central hole 48, for example a threaded hole, is drilled in connecting insert 24, in which hole a securing means 50 of bolt or gudgeon-pin type can be fitted. Even if hole 48 can tolerate a certain clearance to facilitate fitting and connection, this option further enhances centering and therefore optimization of the contact between the two insulating supports 14, 14' and their shielding 20, 20'.

The fitting and friction stresses are very limited on account of the contact between flat surfaces. The use of grease or degassing wire is therefore no longer necessary in the connection according to the invention. It may be advantageous to have a slight decreasing thickness gradient from the periphery to the center of insulating support 14 so as to ensure a homogeneous distribution of the contact pressure forces (removal of air between insulating parts 26, 26' then being performed in the internal cavity 48 of insert 24). Inversely, one of the two surfaces 26' may present an increasing thickness gradient from the periphery to the center of insulating support 14, so as to also remove the air which may be present at the surface to the outside, in parallel with compression.

Thus, as far as a preferred manufacturing of a bar 10 according to the invention is concerned, the conducting core (inserts+rod) 24, 34 is first manufactured, mainly out of copper or aluminum, by means of existing techniques, for example by die-casting or molding. This assembly is molded from casting with an insulator 14, 44 of EPDM or silicone elastomer type, advantageously with an adhesive agent to ensure a cohesive defect-free interface between the conducting core and insulating coating. Shielding 20, 46 can then be performed, for example on a deburred external surface, by metallization or preferably by molding from casting with an elastomer of the same type but charged, which enables the same deformation properties to be kept over the whole of connection device 12, between insulating body 14 and shielding 20.

In a preferred embodiment, a connecting bar 10 for terminals 350 mm apart able to operate at 24 kV (resp. 15 kV) and 630 A comprises two connection devices 12 whose connection surfaces 16, 18 are discs with a diameter of about 105 mm (resp. 80 mm), for example about 40 mm apart, which is the thickness of EPDM insulating support 14. Connection device 12 comprises a copper insert 24 of similar height but smaller than the distance separating the two connection surfaces 16, 18. Its connecting surfaces 26, 28 corresponding to a recess in connection surfaces 16, 18 of insulating support 14 are discs with a diameter of about 25 mm. Thus, when electrical connection is made, insulator 14 is flattened by the height difference between the connection and connecting surfaces on each face, for example about twice 0.5 mm. Rod 34, of oblong cross-section with the small sides in the form of half-circles, is coated with the same insulator 44. The assembly is shielded 20, 46, with a shielding return flange of about 0.5 mm on the periphery of connection surfaces 16, 18 to ensure continuity of shielding.

To ensure insulation of surface 18 of connection device 12 that remains free (opposite in the frame illustrated at electrical connection surface 16), a blanking device 52 is positioned on this free surface 18. This device 52 can further perform compression of the assembly and keep the latter in a compressed position. Blanking device 52 comprises a flat surface of at least equal size to connection surface 18 for which it is intended. The blanking device is preferably an insulating cover whose shape is optimized for dielectric strength, which can for example be coated with an electrostatic shielding metallization preferably arranged for continuity of shielding with connection device 12. To ensure tightness and maximum protection against arc striking, it is preferable for the material of blanking device 52 to be non-deformable, for example a thermosetting material of thermoplastic or epoxy or polyester type.

Preferably, to ensure deformation of support 14 of connection device 12 which it protects and to maintain this state, blanking device 52 can be associated with a threaded rod operating in conjunction with a hole 48 of connecting insert 24. In particular, a rigid insert 54 provided with a tapped hole 58 is fitted in the center of cover 52, for example overmolded in cohesive manner. Hole 58 is designed to operate in conjunction with securing gudgeon-pin 50 passing through hole 48 of insert 24, wherein said pin 50 can even be fitted captive therein. The same means 50 thereby enables cover 52 to be secured on connection device 12. As electrically connecting is not involved here, insert 54 can be of any shape and/or of different material of steel type. It is preferably metallic to perform a role of dielectric deflector and to provide an optimum anchoring quality for solidity of securing. A flexible washer 60 may be associated with the insert, and may also be fitted captively.

Depending on the use involved, blanking and securing cover 52 can be modified, in particular in the case where current input cables are provided. Instead of the cover described, an interface 62 of standard conical format (for example of C type according to the NFC33051 Standard, or other) can be fitted: see sketch in broken lines in FIG. 4A.

Preferably, for the preferred embodiment illustrated and presented above, securing means 50 do not directly solicit connection devices 12 of bars 10. Gudgeon-pin 50 is of smaller diameter than the diameter of hole 48 of inserts 24, which is not threaded, thereby providing a positioning tolerance for the electrical apparatuses 1 connected to one another. Its length depends on the number of superposed connection devices 12, 12', and on the length of the securing holes 58 of blanking devices 52 surrounding it. Cover 52 further advantageously comprises tightening means, for example a hexagonal nut 64 able to operate in conjunction with a spanner enabling the assembly formed by cover 52/washer 60/gudgeon-pin 50 to be rotated to perform compression of insulating supports 14 of connection devices 12.

A blanking device 52 can be provided on each side of the assembly of superposed connection devices 12, 12', if for example it is a question of lengthening joining bar 10 or of pre-assembling a Y-shaped, T-shaped or cross-shaped connection by a set of bars. However, in most cases, connection device 12 of a bar 10 according to the invention is designed to be connected to a terminal of an electrical apparatus 1. For simplicity of assembly, it is preferable for the opposite two faces 16, 18 of connection devices 12 of bars 10 according to the invention to be identical. It is therefore apparent that connection to a terminal of an electrical apparatus 1 is also performed by contact and compression, i.e. in a different manner from in the prior art. A terminal adaptor comprising a flat interface and a conical interface can be fitted on a terminal of existing type.

It is however advantageous for electrical connection to a terminal of a bar 10 according to the invention to also be made directly, by contact and compression, with suitable modification, and in particular "flattening", of the terminals of electrical apparatuses 1. In the preferred embodiment illustrated in FIGS. 2 and 3, similarly to connection device 12, terminal 66 comprises a contact surface 68 superposable on surface 18 of support 14 of connection device 12 of bar 10, and on which a connecting insert 70, preferably provided with a tapped hole 72 corresponding to tapped hole 58 of blanking device 52, opens out. Terminal 66 is mainly composed of an insulating material molded from casting on insert 70, and advantageously presents a deflecting hollow under contact surface 68 which optimizes the dielectric characteristics. Insert 70 also advantageously comprises a bulge under insulating contact surface 68 to optimize the dielectric properties. As for cover 52, the material is preferably non-deformable, of thermosetting or thermoplastic type. Terminal 66 can also be shielded, preferably by a metallization coating, with a possible continuity of shielding achieved by a peripheral metallic return on contact surface 68. Depending on the use of terminal 66, insert 70 extends as usual to the power supply system in electrical apparatus 1.

Connection between two terminals by a bar 10 according to the invention is performed simply by positioning connection devices 12 on terminals 66 with possible sliding for centering, in particular in the absence of guiding means 32, and securing by a blanking device 52 with gudgeon-pin 50 passing through hole 48 and anchoring in tapped hole 72. The method is thereby simplified, with in addition the possibility of lateral clearance. Furthermore, in the case where joining rods 34, 34' of bars 10, 10' are flat and present a certain flexibility, a clearance in the securing direction is permitted (i.e. in the relative height of terminals 66 of electrical apparatuses 1).

This flexibility may be insufficient, in particular in the case of connection of several modules and superposition of bars, and a jointed bar may prove to be an interesting option. First bar 10 of FIG. 2A is in fact necessarily offset in the direction orthogonal to connection surface 18 with respect to second bar 10', due to the fact that their connection devices 12, 12' are superposed. The first and last connection devices 12, 12' of the two bars 10, 10' are distant from each other, the distance corresponding to the thickness of the connection device 12. It is certainly possible to modify the terminals of the electrical apparatuses by lengthening them (see terminal 66' of FIG. 4A) to be able to raise an independent connection. This solution is however heavy to implement and unable to be upgraded. According to an option of the invention, raising spacers 76 of terminals 66 are provided, substantially corresponding to connection devices 12, without extension by a joining rod 34: see FIG. 3.

Figure 4A:
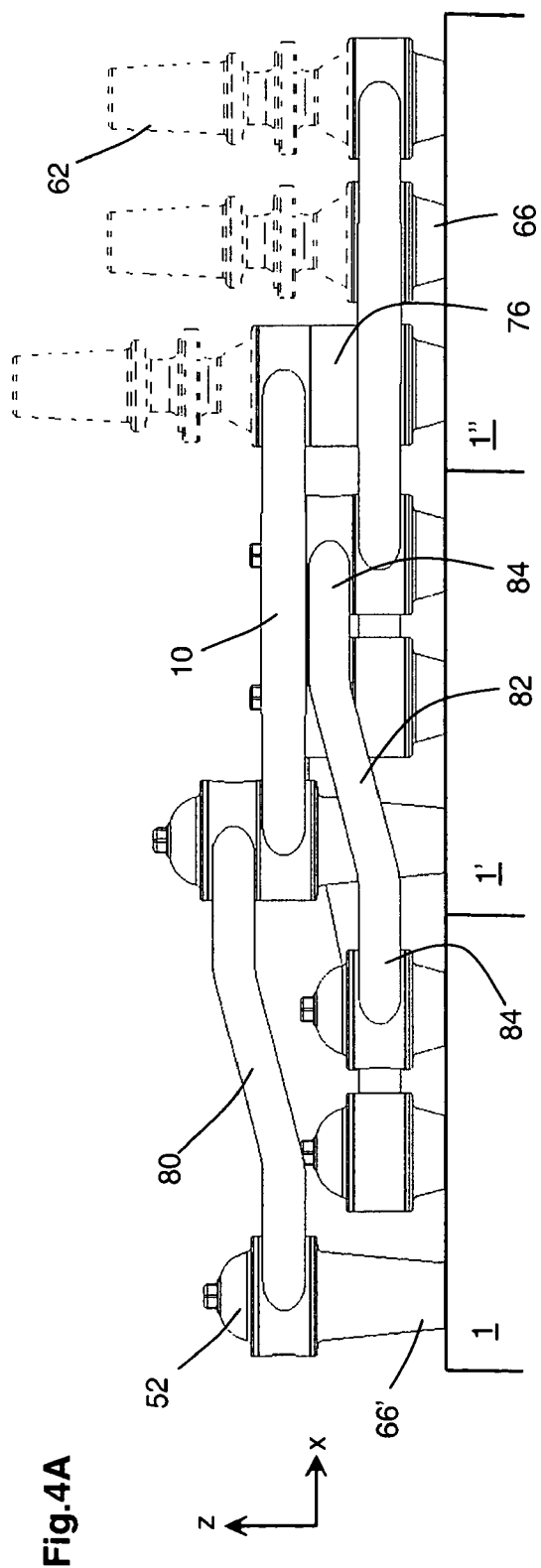
FIGS. 4A and 4B represent two views of connection of three electrical apparatuses similar to that of FIG. 1 by bars according to an embodiment of the invention.

According to another preferred option of the invention, some connecting bars 10 are such that the two connection devices are in the same plane (FIG. 2) and other connecting bars 80 comprise a rod 34 presenting a shoulder 82, i.e. a part that is tilted with respect to the plane defined by connecting surfaces 26 (FIG. 4A). To solve the problem illustrated in FIG. 2A, shoulder 82 of joining rod 34, in the direction orthogonal to connection surfaces 16, 18, corresponds to the thickness of a connecting insert 24. The length of shoulder 82 in the longitudinal direction of rod 34 is optimized for dielectric continuity, conduction, etc. Part 82 that deviates with respect to contact surfaces 16, 18 is preferably centered on joining rod 34, and its length can for example be about half the distance separating two connecting inserts 24. In the previous preferred embodiment, we therefore have a rod 34 presenting two end parts 84 parallel to first connection device 12 and joined by an oblique part 82.

Moreover, in particular for modular electrical apparatuses, the general space required for connection by means of the system according to the invention can be minimized. Indeed, whereas previous solutions imposed an offset between terminals 2 to position bars 4, 8, due to the flatness of the connection according to the invention, it is possible to manage different relative orientations of bars 10, and in particular to perform connections in parallel on aligned terminals 66, 66' of electrical apparatuses 1 according to FIG. 1.

Figure 4B:
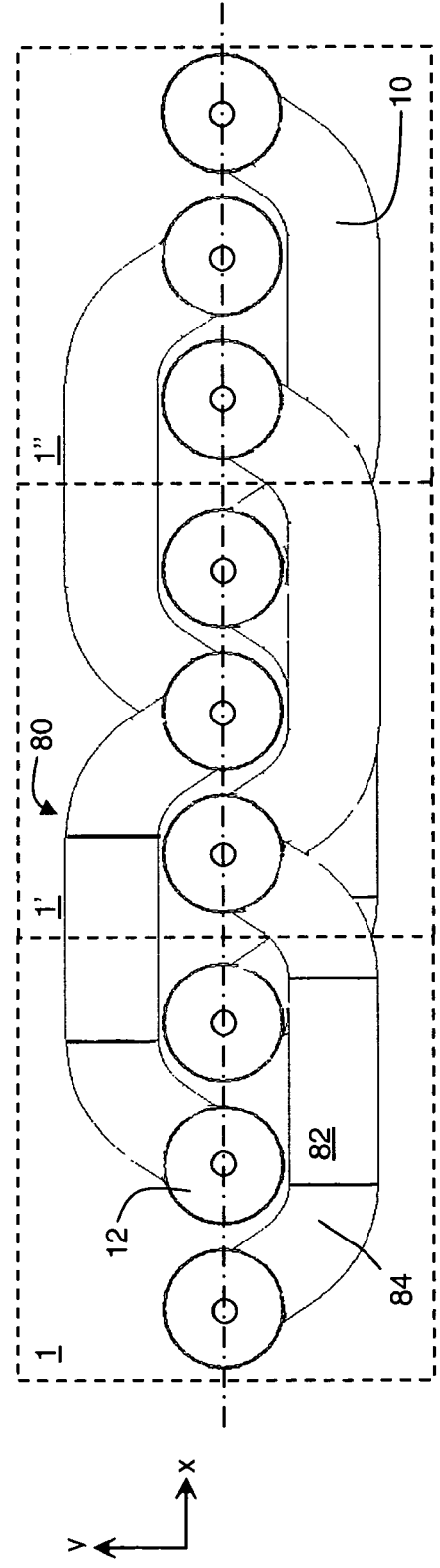

In particular, as illustrated in FIG. 4, by configuring connecting bars 10, 80 in standardized manner, it is possible to imbricate connection devices 12 and, in the case illustrated, to perform three connections of three aligned terminals. Joining rod 34 between connection devices 12 of a preferred embodiment of a bar 10, 80 according to the invention is curved to form a U which enables a connection device 12 of another bar 10, 80 to be fitted between its two ends. As illustrated in FIGS. 2B and 4B, rod 34 thus comprises a central part 86 between the two end parts 38 joined to inserts 24 of connection devices 12. Seen along the perpendicular to connection surfaces 16, 18, central part 86 of rod 34 is external to the envelope defined by the two connection devices 12 of its ends, so that another connecting bar 10 according to the invention can be fitted in symmetrical manner and cross the first one.

This preferred embodiment thus enables the overall space required to be limited. In particular, for the connection illustrated in FIGS. 4A and 4B, the space occupied in the widthwise direction y in the (x,y) plane of connection surfaces 16 can be smaller than twice the space occupied by terminals 66 themselves. Furthermore, the space occupied in the heightwise direction z between the top surface of terminal 66 and the extreme point of a blanking device 52 when two bars 10, 10' are superposed can be less than 200 mm.

Furthermore, as specified above, the positioning of terminals 66 to be connected can be offset from the ideal location with an increased tolerance. In the same embodiment, a clearance at least equal to ±1.5 mm in the widthwise direction x is tolerated for each connection device 12, i.e. a positioning error of 3 mm with respect to the ideal connection line in FIG.

4B. Rod 34 itself, due to its curvature 86, enables a substantially equivalent difference of connection length x. In addition, due to the flat shape of rod 34 and to overmolding of adhered elastomer, a heightwise positioning error z between two pole-units of two cubicles to be connected is able to be tolerated.

For this type of modular assembly 1, 1', 1", it is further possible to modify the number of modules at a late stage, in particular enabling easy extension 1s, due to connecting bars 10, 80 according to the invention. More generally, any modification in the connection arrangements is simplified. In particular, adding a cubicle 1s in an electric panel to increase the power simply consists in: removing three covers 52 of an end cubicle 1", inserting three connecting bars 10, 80, with possible coupling of a raising spacer/disc 76 on a terminal 66, then screwing the removed covers 52 back, and screwing three covers on connection devices 12 fitted on terminals 66 of the new end cubicle 1s. It is no longer necessary to totally change bars 8 or to provide additional terminals 2s for possible connections. It is also possible to modify covers 52 to replace them by cable inputs 62 if required.

Thus, in the system according to the invention, few pieces perform the main connection functions. Contact and electrical connection are achieved by removing conducting insert 24 with respect to the elastomer 14 on surface 16 ensuring deformation of said elastomer before electrical contact is made. Tightness of the interfaces is managed by elastic deformation and adherence of the molding from casting of insulating elastomer, which at the same time guarantees dielectric insulation of bar 34 and of connection inserts 24. Tight securing is achieved by simple screwing. Control of the dielectric stresses is achieved by suitable design of the different components and interfaces, in particular their shape, nature and positioning with an embedding of connecting conductors 14, 34 in insulator 12, 42 and possible electrostatic shielding 20, 46 which contributes to the ruggedness of the system.

Other components of a connection system can undergo a modification like disclosed above to e.g. be connected to a planar terminal 66 and/or a connecting bar 10 according to the invention, in particular in conjunction with a blanking device 52. It is possible to flat conical cable connectors. A flat cable connector thus comprises a connexion part similar to a connexion device 12 or a raising spacer 76 as previously described, wherein the conducting insert 24 is laterally extended in a cable coupling device which is itself embedded in the deforming material 14 to form a coupling part. The coupling part may be shielded and it forms a mandrel with a passing through orifice around the tubular coupling device so that insertion of a lug-like cable terminal is possible. To be connected, one end of the cable is associated with a lug connecting element. It is inserted by force in the mandrel out of deformable material until coupling between the connecting element and the coupling device so as to ensure air-tight interface at the orifice of the mandrel and at insert 24. The cable coupling device thus formed can be put in place on a terminal 66, another cable coupling device and/or a connection device 12 of a bar 10 according to the invention with orthogonal compression until inserts of the two components contact each other.

Among other advantages, connecting bar 10, 10', 80 according to the invention enables:
- numerous pieces that were previously indispensable for connections such as intermediate sleeves to be eliminated, thereby reducing costs and risks of forgetting elements;
- the interface to be simplified thereby enhancing reliability of fitting;
- time to be gained when making connections, in particular due to connection by simple contact and easy tightening, with removal of air at the interface without assistance or lubrication due to optimum flat and no longer conical compression;
- the risks of arc striking to be eliminated, even in the presence of triple points, due to the presence of dielectric stress deflectors;
- installation time to be reduced due to better management of alignment faults between the components to be connected. In particular, two degrees of freedom in assembly can be authorized due to the use of flat non-conical interfaces and possible sliding of one connection onto the other. A third partial degree of freedom by the use of a metal bar of flat shape and a flexible securedly attached insulator enables heightwise adjustments and slight angle faults of the connecting strips on output from the electrical apparatus;
- the overall dimensions to be reduced, in particular the connection height, so that it is possible to superpose the connecting bars "without any limits" due to the reduction of the number of interfaces;
- the compactness of the electrical apparatus to be increased, given that alignment of the pole-units is henceforth permitted for connection of cubicles;
- adaptation to a large number of configurations in spite of a reduced number of elements;
- panel configuration modifications or extensions to be made rapidly.

Although the invention has been described with reference to connecting bars of medium voltage cubicles, it is however not limited thereto. Other systems may also be concerned by the invention.

The invention claimed is:

1. An electrical connecting bar comprising:
   at least two connection devices which each comprise a support made of insulating material that is able to be deformed and delineated by two substantially parallel opposite connection surfaces, and a conducting connecting insert integrated in the insulating support and opening out onto the two connection surfaces at the level of two parallel flat connecting surfaces, the height of the insert between its two connecting surfaces being smaller than the distance between the two connection surfaces when the insulating material of the support is at rest, and greater than or equal to said distance when the material is completely deformed by compression between its connection surfaces;
   a conducting rod joining the connecting inserts of two connection devices, said conducting rod being, as far as its end parts are concerned, integrated in the insulating support of the connection devices and, as far as its residual part is concerned, integrated in an insulating coating;
   wherein the interfaces between the insulating supports, conducting inserts, conducting rod and insulating coating of the bar are air-tight.

2. The electrical connecting bar according to claim 1 wherein the joining rod is unitary with the connecting inserts, and the insulating supports are unitary with the coating of the joining rod.

3. The electrical connecting bar according to claim 2 wherein the insulating material is an elastomer overmolded on the conducting elements.

4. The electrical connecting bar according to claim 3 further comprising, on at least a part of the external surface of the bar, an overmolding of the elastomer charged to be conducting which acts as electrostatic shielding.

5. The electrical connecting bar according to claim 1 further comprising an electrostatic shielding on the external surface of the connecting bar, with the exception of the connection surfaces and connecting surfaces of the connection devices.

6. The electrical connecting bar according to claim 1 wherein the opposite two connection surfaces and the two connecting surfaces of at least one connection device are in the form of concentric, preferably superposable, discs.

7. The electrical connecting bar according to claim 1 wherein the insulating support of the connection devices forms a neck at the ends of the connecting insert, so that said insert is embedded in the insulating material.

8. The electrical connecting bar according to claim 7 wherein the joining rod is unitary with the connecting inserts, said conducting elements being overmolded by the same elastomer forming the insulating supports and the coating of the joining rod, and the external surface of the connecting bar, with the exception of the connection surfaces and connecting surfaces of the connection devices, being coated by an electrostatic shielding.

9. The electrical connecting bar according to claim 1 wherein the connecting surfaces of the inserts of the two connection devices are parallel and in the same plane.

10. The electrical connecting bar according to claim 1 wherein the connecting surfaces of the inserts of the two connection devices are parallel and offset along the axis perpendicular to said surfaces between the two connection devices, the joining rod comprising a shoulder.

11. The electrical connecting bar according to claim 1 wherein the joining rod is a flat lug the two large of which are substantially parallel to the connecting surfaces of the inserts of the connection devices.

12. The electrical connecting bar according to claim 1 wherein the joining rod is U-shaped with a central part between its end parts so that, in a view perpendicular to the connecting surfaces, the central part of the rod is outside the envelope delineated by the two connection devices.

13. The electrical connecting bar according to claim 1 further comprising securing means of the connection devices in the direction orthogonal to the connecting surfaces.

14. The electrical connecting bar according to claim 13 wherein the securing means of at least one connection device comprise a hole in the connecting insert.

15. The electrical connecting bar according to claim 13 further comprising a blanking device for a connection device, the blanking device comprising a flat insulating surface superposable on the surface of the support for which it is intended.

16. The electrical connecting bar according to claim 15 wherein the blanking device is provided with an insert comprising a threaded hole, the connecting insert of the associated connection device comprises a hole, said bar being associated with a gudgeon-pin operating in conjunction with said holes for the purposes of securing.

17. An omnibus bar comprising several electrical connecting bars according to claim 1 wherein all the connection devices are superposable.

18. An electrical connecting bar comprising
two similar connection devices which each comprise a support made of insulating material that is able to be deformed and delineated by two substantially parallel, circular, opposite connection surfaces, and a conducting connecting insert integrated in the insulating support and opening out onto the two connection surfaces at the level of two parallel flat circular connecting surfaces, the height of the insert between its two connecting surfaces being smaller than the distance between the two connection surfaces when the insulating material of the support is at rest, and greater than or equal to said distance when the material is completely deformed by compression between its connection surfaces;
a conducting rod integral with and joining the connecting inserts of the connection devices, said conducting rod being, as far as its end parts are concerned, integrated in the insulating support of the connection devices and, as far as its residual part is concerned, integrated in an insulating coating;
wherein the insulating coating and the insulating supports are of the same elastomer which is overmolded on the conducting inserts and conducting rod such as having an air-tight interface, and wherein the flat connecting surfaces of both inserts are parallel to each other.

19. An omnibus bar comprising three electrical connecting bars according to claim 18 wherein each connection device is similar to the others and provided with a threaded hole in its insert, further comprising three blanking devices comprising a flat insulating surface superposable on the surface of a support of a connection device and an insert comprising a threaded hole, and three gudgeon-pins operating in conjunction with said holes for the purposes of securing a blanking device and a connection device.

20. An electrical connecting bar comprising:
at least two connection devices which each comprise a support made of insulating material that is able to be deformed and delineated by two substantially parallel opposite connection surfaces, and a conducting connecting insert integrated in the insulating support and opening out onto the two connection surfaces at the level of two parallel flat connecting surfaces, the height of the insert between its two connecting surfaces being smaller than the distance between the two connection surfaces when the insulating material of the support is at rest, and greater than or equal to said distance when the material is completely deformed by compression between its connection surfaces;
a conducting rod in the form of a flat lug integral between two connecting inserts, the larges of which are substantially parallel to the connecting surfaces of the inserts of the connection devices, thereby forming a conducting core of the connecting bar, said conducting rod being, as far as its end parts are concerned, integrated in the insulating support of the connection devices and, as far as its residual part is concerned, integrated in an insulating coating;
an electrostatic shielding on the external surface of the connecting bar, with the exception of the connection surfaces and connecting surfaces of the connection devices;
wherein the interfaces between the insulating supports, conducting core and insulating coating of the bar are air-tight.

* * * * *